United States Patent [19]

Köppel

[11] Patent Number: 5,551,818
[45] Date of Patent: Sep. 3, 1996

[54] SELF-DRILLING FASTENER

[75] Inventor: Norbert Köppel, Widnau, Switzerland

[73] Assignee: SFS Industrie Holding AG, Heerbrugg, Switzerland

[21] Appl. No.: 284,624

[22] PCT Filed: Dec. 10, 1992

[86] PCT No.: PCT/EP92/02862

§ 371 Date: Aug. 11, 1994

§ 102(e) Date: Aug. 11, 1994

[87] PCT Pub. No.: WO93/16292

PCT Pub. Date: Aug. 19, 1993

[30] Foreign Application Priority Data

Feb. 11, 1992 [DE] Germany .......................... 42 03 949.5

[51] Int. Cl.⁶ .............................. F16B 13/04; F16B 25/00
[52] U.S. Cl. ............................................. 411/387; 411/29
[58] Field of Search ................................ 411/29, 30, 31, 411/386, 387

[56] References Cited

U.S. PATENT DOCUMENTS

| | | | |
|---|---|---|---|
| 4,257,307 | 3/1981 | Regensburger | 411/387 |
| 4,480,951 | 11/1984 | Regensburger | 411/387 X |
| 5,183,357 | 2/1993 | Palm | 411/29 |
| 5,213,459 | 5/1993 | Palm | 411/387 X |
| 5,383,753 | 1/1995 | Palm | 411/29 |

FOREIGN PATENT DOCUMENTS

| | | |
|---|---|---|
| 2801962 | 7/1978 | Germany . |
| 4003374 | 5/1991 | Germany . |
| 4003375 | 5/1991 | Germany . |

*Primary Examiner*—Neill R. Wilson
*Attorney, Agent, or Firm*—Helfoott & Karas P.C.

[57] ABSTRACT

A self-drilling fastener includes a fastening element and a plate-shaped drilling insert inserted in a slot of the fastening element. The lateral peripheral surfaces of the insert have channels which extend over the whole width of the insert. Pressed into the channels are edges of jaws which define the slot of the fastening element so that the insert is held in the fastening element by plastic deformation.

7 Claims, 2 Drawing Sheets

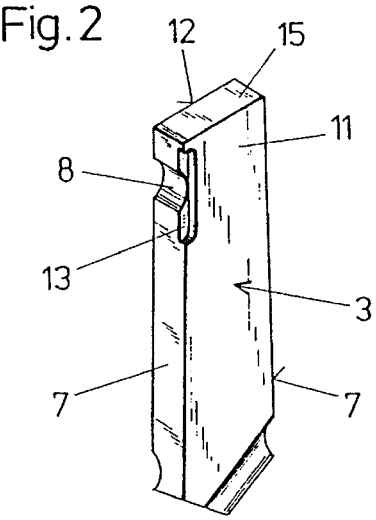
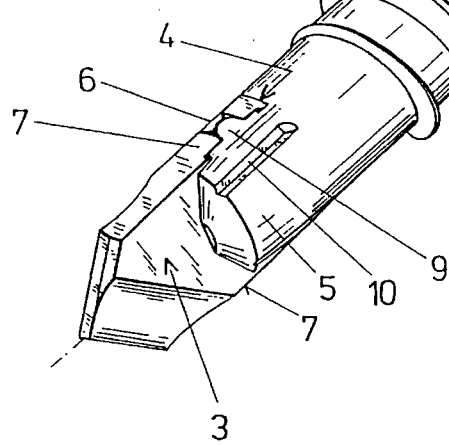
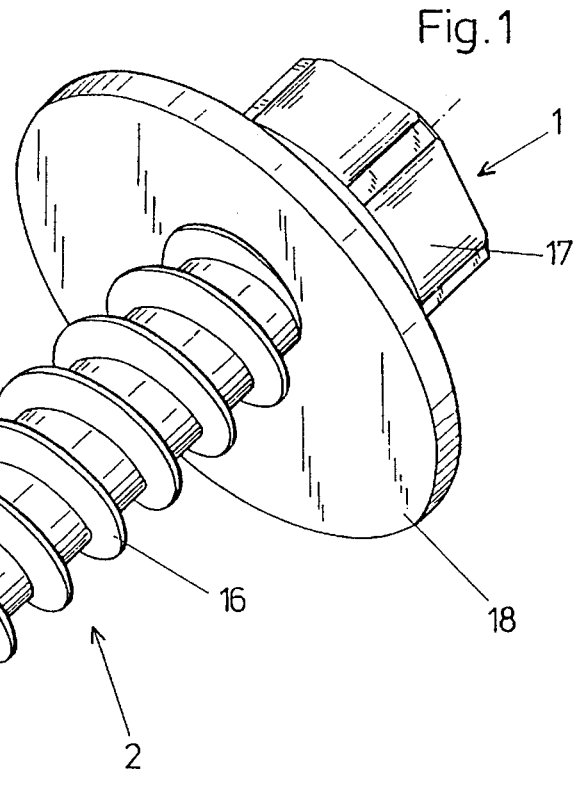
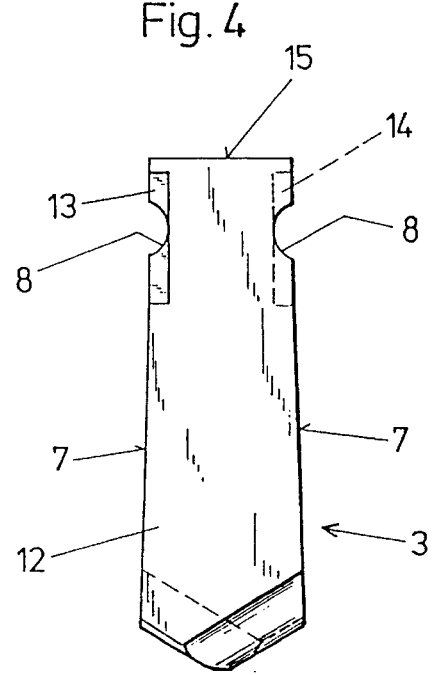
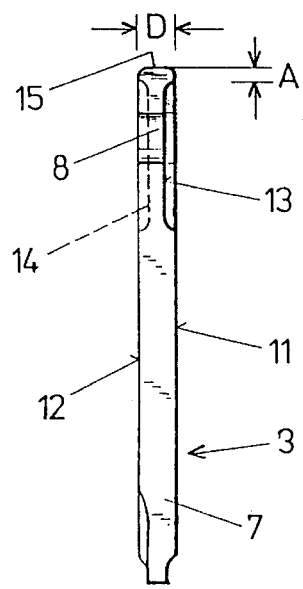

1

SELF-DRILLING FASTENER

BACKGROUND OF THE INVENTION

The present invention relates to a self-drilling fastener, comprising a fastener element with a slot, formed at its free end and constructed parallel to the axis of the fastener, and a platelet-shaped drilling insert, the end of which is inserted into the slot at the fastening element, the drilling insert being connected positively and non-positively due to the deformation of the jaws forming the boundary of the slot at the fastening element.

A self-drilling screw is already known (DE-C-28 01 962), the drilling part of which is formed by a cutting insert inserted into a longitudinal slot of the screw shaft. The side edges of the cutting insert are provided with recesses, into which the edge region or partial region in question of the jaws of the screw shaft, forming the boundary of the slot, is or are pressed in order to form a solid positive and non-positive connection between the cutting insert and the screw shaft. The corresponding regions of the jaws are thus pressed into indentations at the surface of the platelet-shaped cutting insert until they lie against the base of this recess. There is thus only a slight deformation of the edge regions of the jaws and no particularly strong plastic deformation of the jaws due to the solid counter-surface at the cutting insert. Many years of practical use have shown that this type of fastening of the cutting insert has been entirely optimum in the past and that the required safety against loss is provided by this positive and non-positive holding of the cutting insert. Furthermore, the necessary torque during the drilling can be transferred properly.

As a result of the optimum use of such self-drilling screws with a platelet-shaped cutting insert, the range of uses is constantly being enlarged. The drilling is not restricted only to thin sheet metal. This means that the depths of drilling, which can be managed by such self-drilling fasteners, are also constantly being extended. In order to be able to use such self-drilling fasteners also in thick material that is, for example, in steel girders with a wall thickness of 8 mm, 12 mm or more, it is necessary to make the steel inserts correspondingly longer.

SUMMARY OF THE INVENTION

It is an object of the present invention to provide a self-drilling fastener of the aforementioned type, for which cutting inserts with a larger axial length can be connected sufficiently firmly with the fastener element, without requiring additionally welding, soldering or bonding operations.

Pursuant to the invention the drilling insert has, at its end region engaging the slot of the fastener element at one or both lateral boundary surfaces, one or more notches, incisions, grooves or channels, which are continuous over the thickness of the drilling insert and into which an edge region of the jaw or the edge regions of both jaws of the fastening element is or are pressed with plastic deformation.

In the case of cutting inserts of longer axial length, the sideways tilting of the cutting insert during the drilling process is a problem. By means of the inventive measures, the cutting insert is clamped at the two mutually opposite narrow sides positively and non-positively between the jaws forming the boundary of the slot, so that the cutting insert can no longer tilt sideways.

When the jaws, forming the boundary at the slot fastener element, are pressed merely into recesses of low depth, these regions of the jaws are deformed plastically only insignificantly and can spring back partially once again after the pressing process. This was adequate for holding cutting inserts of relatively short axial length.

Due to the inventive measures, the corresponding edge region of the jaws is pressed with plastic deformation into the channel extending over the thickness of the drilling insert, so that elastic recovery is no longer possible. It has been shown experimentally, that the shearing-out value can, at least, be doubled by the inventive measures. With this, the present invention can also provide the possibility of being able to use platelet-shaped cutting inserts, which are optimum for a drilling process, also for drilling in relatively thick materials, without the need for additionally processing measures such as welding, soldering or bonding.

The sections of the jaws, pressed into the notches, incisions, grooves or channels, form so to say anchoring tabs, which secure the cutting insert against tilting sideways.

In an embodiment, the notches, incisions, grooves and channels, are disposed in mirror-image fashion to one another at the two lateral boundary surfaces of the drilling insert. The plastically deformed, pressed-in regions of the jaws thus always lie at the same axial height. This is advantageous, since the cutting inserts can be supplied for the pressing process without problems, because they are constructed identically at the two side edges. At the same time, it also does not matter whether one channel or the like or two or several such channels are provided at the two, lateral, limiting surfaces.

For particular uses, it may be advantageous if the notches, incisions, grooves or channels are disposed mutually offset of the two, lateral, bounding surfaces of the drilling insert. In such a case, however, the platelet-shaped drilling insert must be supplied during the manufacture of the self-drilling fastener in an orderly manner and in the correct position in agreement with the construction of the corresponding pressing tool.

For manufacturing the platelet-shaped drilling insert as well as for holding it well after the pressing process, it is advantageous if the notches, incisions, grooves or channels are bounded circularly in cross section. As a result, optimally shaped anchoring tabs, which prevent lateral tilting of the drilling insert, result from the pressing process and the plastic deformation.

In the case of a further variation of an embodiment, the previous construction of a platelet-shaped drilling insert is combined with the inventive characteristics in order to achieve even better anchoring against sideways tilting of the cutting insert. In the case of such a construction, it is proposed that the two lateral boundaries of the drilling insert be formed at opposite surface recesses, the notches, incisions, grooves or channels, extending over the thickness of the drilling insert, being provided in the region of these recesses.

Especially in conjunction with this structural variation, it is advantageous if the recesses commence close to the end of the drill insert and extend over a large portion of the length of the section of the drilling insert in the slot. An additional holding effect of the drill insert in the slot of the fastener element is achieved due to the fact that the lengths of this recess is limited at both ends.

Pursuant to a further variation, it is also possible, in addition to this special positive and non-positive connection between the fastener element and the drilling insert, to achieve an optimum, same axis centering between drilling insert and fastener element already before the pressing process. For this purpose, it is proposed that the drilling insert have at its one end a continuation of lesser width, which engages in a centering manner a central opening adjoining the slot in the fastener element. There is thus already a centering alignment between the drill insert and the fastener element during the pre-assembly. This centering alignment is then assured optimally by the pressing process.

The invention is explained in greater detail in the specification below by means of an embodiment.

BRIEF DESCRIPTION OF THE DRAWINGS

FIG. 1 shows an inclined view of a drilling screw;

FIG. 2 shows an inclined view of a drilling insert;

FIG. 3 shows a side view of the drilling insert;

FIG. 4 shows a front view of the drilling insert;

DETAILED DESCRIPTION OF THE PREFERRED EMBODIMENTS

Figure 5:
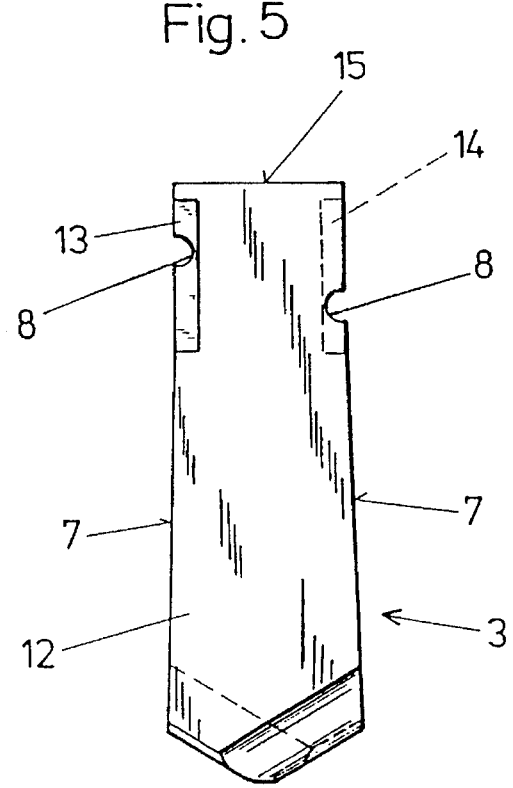
FIG. 5 shows a front view of the drilling insert with mutually offset channels.

The invention is described in greater detail by means of a self-drilling and thread-cutting screw. However, the inventive measures can be also used with all self-drilling fasteners, that is, for example, also with self-drilling blind rivets, where the cutting insert is connected to the rivet shaft and/or the rivet casing, or also with self-drilling pegs.

A drilling insert 3 has, at its end region engaging the slot 4, has channels 8 provided at its lateral boundary surfaces. These channels 8 extend over the thickness D of the drilling insert 3. After the drilling insert 3 is inserted in a slot 4 of the fastener element 2, the lateral edge regions of the jaws 5, 6 are deformed by a pressing process, partial regions of the jaws 5, 6 being molded plastically into the channels 8 of the drilling insert 3 and forming, so to say, anchoring tabs 9. After the pressing process has been carried out, a corresponding indentation 10 can be seen in the surface of the jaws 5 and 6. Due to this strip-shaped projection of the pressing tool, the edge region of the jaws 5, 6 is deformed more easily than it is in the case of a deformation over the full surface. Lesser forces are therefore required for the pressing process.

It is possible to deform in each case one side edge region of the jaws 5, 6 appropriately, so that in each case the anchoring tab 9 of the one or the other jaw engages the opposite, lateral boundary surfaces of the drilling insert 3. It is, however, also conceivable to carry out this deformation only from the direction of one jaw 5 or 6, so that the two anchoring tabs, engaging the channels 8, are formed at one jaw 5 or 6, the opposite jaw lying merely against the surface of the cutting insert 3. It is, however, also possible within the scope of the invention to deform both jaws 5 and 6 correspondingly at the two side edge regions, so that in each case two oppositely directed anchoring tabs engage each channel 8 at the cutting insert 3.

At both side boundaries at opposite surfaces 11, 12, the cutting insert 3 shown in the drawing has recesses 13, 14. Such recesses 13, 14 can also be provided at each surface 11 and 12 on both sides, that is, at both edge regions. When such recesses 13, 14 are present, it is advantageous if these commence at a short distance A from the end 15 of the drilling insert 3 and extend over a greater portion of the length of the section of the drilling insert 3 inserted in the slot 4. An additional improvement in the positive and non-positive connection between the fastening element 2 and the drilling insert 3 is provided by these recesses 13, 14.

For the embodiment shown, channel 8 is provided at each of the two boundary surfaces 7 of the cutting insert 3. These two channels 8 are disposed in mirror image fashion to one another. It is entirely possible within the scope of the invention to dispose the channels 8 at the two lateral boundary surfaces 7 of the drilling insert 3 so that they are offset to one another in the axial direction. This does not involve any additional manufacturing expense, if a pressing tool is used, which has a linear shoulder surface, since the anchoring tabs 9 can be produced by plastic deformation wherever the corresponding channels 8 are disposed. Special pressing tools are therefore not required. Moreover, the drilling insert 3 need also not then be delivered accurately to a precise location. If, however, special pressing tools are used, which have projecting parts matched to the channels 8, attention must be paid to delivering the drilling inserts 3 to the correct position. Up to now, there has only been mention of channels 8 disposed on both sides of the lateral boundary surfaces 7. It would, however, be also conceivable to provide these channels 8 only on one side at a lateral boundary surface 7, if sufficient counter-holding, for example, by means of an appropriately deep recess 13 or 14, is possible. For optimum anchorage, to prevent lateral tilting of the drilling insert 3, however, it is always advisable to provide appropriate channels 8 at both sides of the lateral bounding surfaces 7 of the drilling insert 3. It would furthermore be conceivable to provide more than one such channel 8 at one or both lateral bounding surfaces 7 of the drilling insert 3.

In the case of the embodiment shown in the drawing, the channel 8 is bounded circularly in cross section. This is advantageous for stamping reasons and also for ensuring good engagement of the anchoring tabs 9 formed during the pressing process. Within the scope of the invention, however, it would also be possible to construct the channels 8 with a different cross-sectional shape or surface configuration or, for example, with a correspondingly greater axial length.

In a further constructive variation, the drilling insert is formed at its one end 15 with a continuation, the width of which is less than that of the drilling insert 3. In that case, however, additional measures are required at the fastening element, that is, a central opening, in which the continuation of the drilling insert 3 can then be inserted so as to be centered, must be provided adjoining the slot in the fastening element 2. With that, the possibility is provided of ensuring a centered, equal-axis alignment of the fastening element 2 and of the drilling insert 3 already before the pressing process.

The way, in which thread 16 or head 17 of the fastening element 2 is constructed and whether or not a washer 18 is provided are not related to the present invention. However, these parts were also shown in the drawing in order to illustrate a self-drilling fastener more clearly.

In the specification channels 8 are desired in detail. Instead of such channels 8, notches, incisions, grooves or the like, possible with special cross-sectional shapes depending on the use, can also be provided.

For self-drilling fasteners, it is usually assumed that the cutting insert 3 is manufactured from a drilling steel or a hard alloy and that the fastening element is made from a different steel or from stainless steel. It would, however, also be entirely conceivable to use an inventive drilling insert also with fastening elements of other metals such as brass or with fastening elements of plastic, cast parts or the like. In the case of fastening elements of plastic, the mutual positive and non-positive anchoring of fastening element 2 and drilling insert 3 can be bought about by a pressing process at an elevated temperature.

Figure 6:
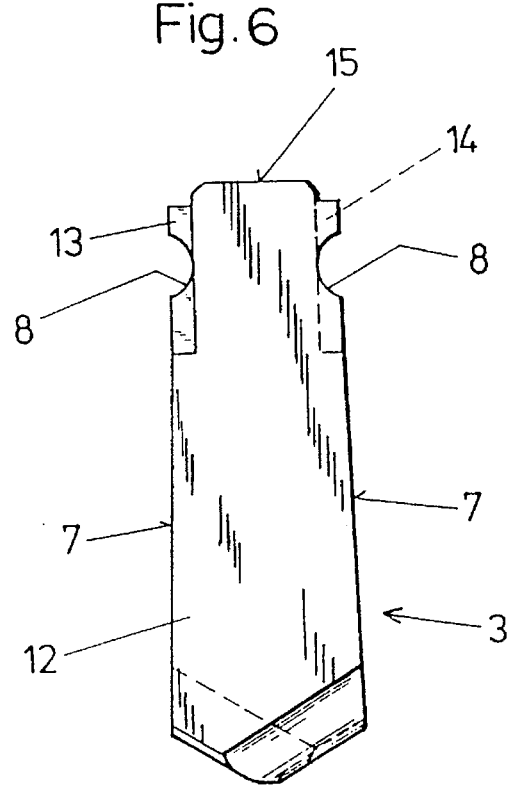
FIG. 6 shows a front view of the drilling insert with a reduced width at the end thereof.

FIG. 5 shows two channels 8 which are disposed mutually offset at both lateral surfaces 7 of the drilling insert 3. FIG. 6 shows the drilling insert 3 with a reduced width at its end 15.

I claim:

1. A self-drilling fastener comprising a fastener element having two jaws and a slot defined by said jaws and formed at a free end thereof and extending parallel to an axis of the fastener, and a plate-shaped drilling insert having an end inserted into the slot of the fastening element, the drilling insert being connected to the fastening element due to deformation of said jaws forming a boundary of the slot of the fastening element, the drilling insert having at an end region thereof engaging the slot of the fastener element at one lateral boundary surfaces one or more groove means selected from the group consisting of notches, incisions, grooves and channels, which extend over a thickness (D) of the drilling insert and into which an edge region of a respective jaw is or edge regions of both said jaws of the fastening element are pressed with plastic deformation.

2. The self-drilling fastener of claim 1, wherein two of said groove means are disposed in mirror-image fashion in respect to one another at both lateral boundary surfaces of the drilling insert.

3. The self-drilling fastener of claim 1, wherein two of said groove means are disposed mutually offset at both lateral boundary surfaces of the drilling insert.

4. The self-drilling fastener claim 1, wherein said groove means are bounded circularly in cross section.

5. The self-drilling fastener of claim 1 wherein recesses are formed at both side boundaries of the drilling insert at opposite surfaces thereof, said groove means extending over the thickness (D) of the drilling insert being provided in the region of said recesses.

6. The self-drilling fastener of claim 5, wherein said recesses commence a short distance (A) from an end of the drilling insert and extend over a greater part of the length of a section of the drilling insert inserted in the slot.

7. The self-drilling fastener of claim 1, wherein the drilling insert has at one end thereof a continuation of a lesser width, which engages in the fastener element.

* * * * *